United States Patent

[11] 3,603,234

[72] Inventors Horst Strehle;
Walter Hennig; Manfred Wiessner; Heinz
Schulze, all of Dresden, Germany
[21] Appl. No. 799,060
[22] Filed Feb. 13, 1969
[45] Patented Sept. 7, 1971
[73] Assignee **VEB Pentacon Dresden Kamera-und
Kinowerke**
Dresden, Germany

[54] SINGLE-LENS REFLEX CAMERA WITH EXPOSURE METER
5 Claims, 4 Drawing Figs.

[52] U.S. Cl. ................................................ 95/42,
95/10 C
[51] Int. Cl. ................................................ G03b 19/12
[50] Field of Search ................................... 95/42, 10
C, 11, 44

[56] References Cited
UNITED STATES PATENTS
3,262,380 7/1966 Winkler ..................... 95/10

Primary Examiner—Samuel S. Matthews
Assistant Examiner—Richard L. Moses
Attorney—Young & Thompson ABSTRACT: A camera is provided with a photoelectric exposure meter influenced by light passing through a detachable objective lens having a diaphragm presetting control. A first indicating means is influenced by a photoelectric device of the exposure meter and a second indicating means is movable by a first setting element provided on the lens adjustable by the diaphragm presetting control. A second setting element on the lens is positioned according to the maximum aperture of the lens and operates one of the first and second indicating means. Alignment of the first and second indicating means by adjustment of the diaphragm presetting control sets the value required for accurate exposure. A lens without diaphragm presetting control and without setting elements can be used when the first and second indicating means attain a predetermined relative position and alignment of the two indicating means by adjustment of the lens diaphragm indicates that the aperture is set to a value required for accurate exposure.

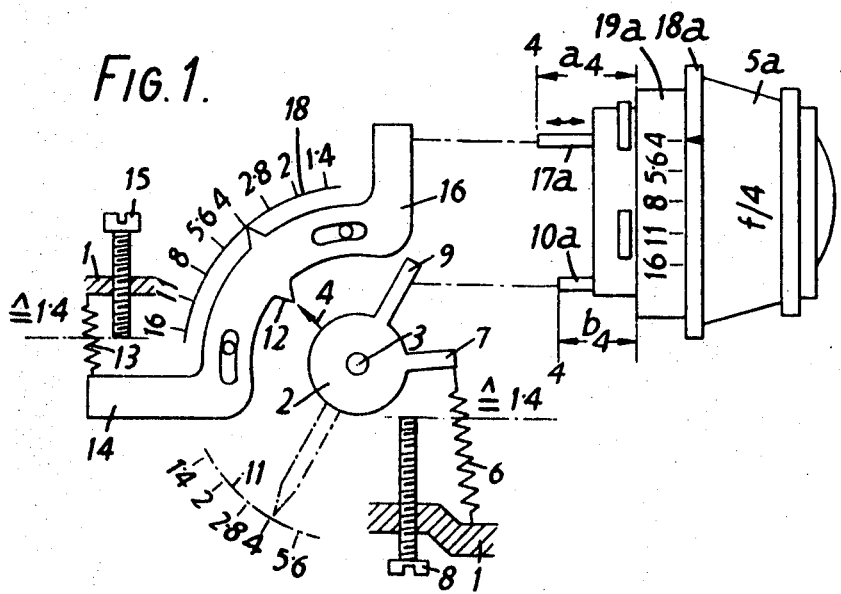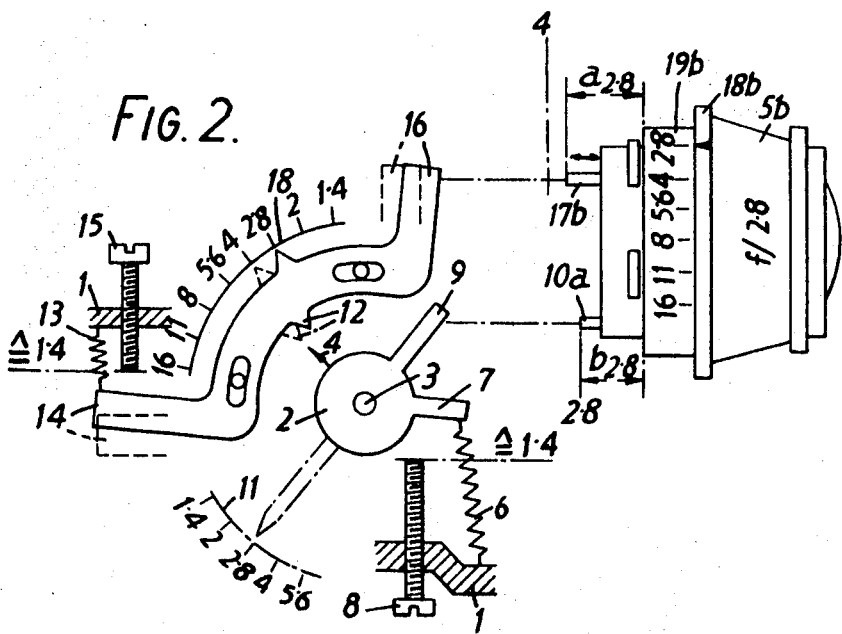

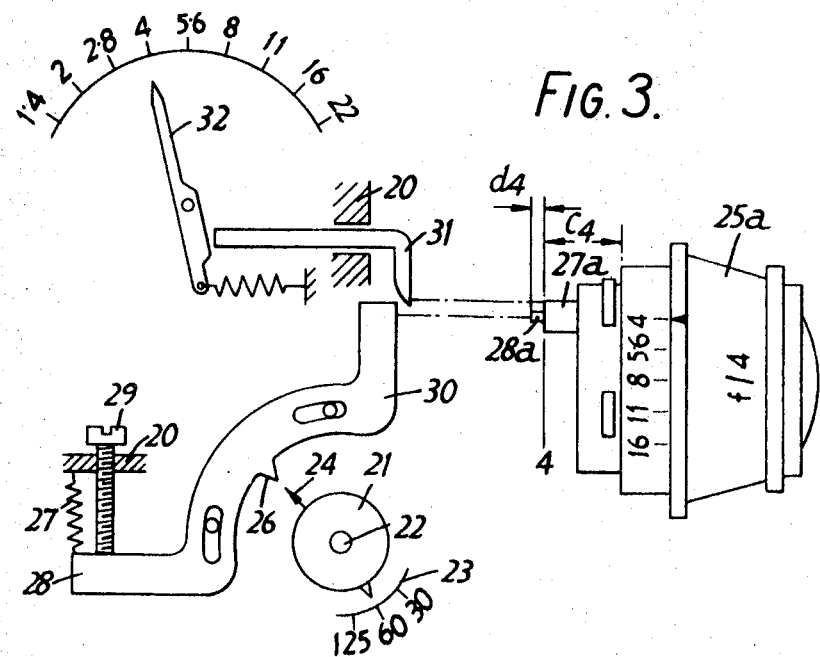
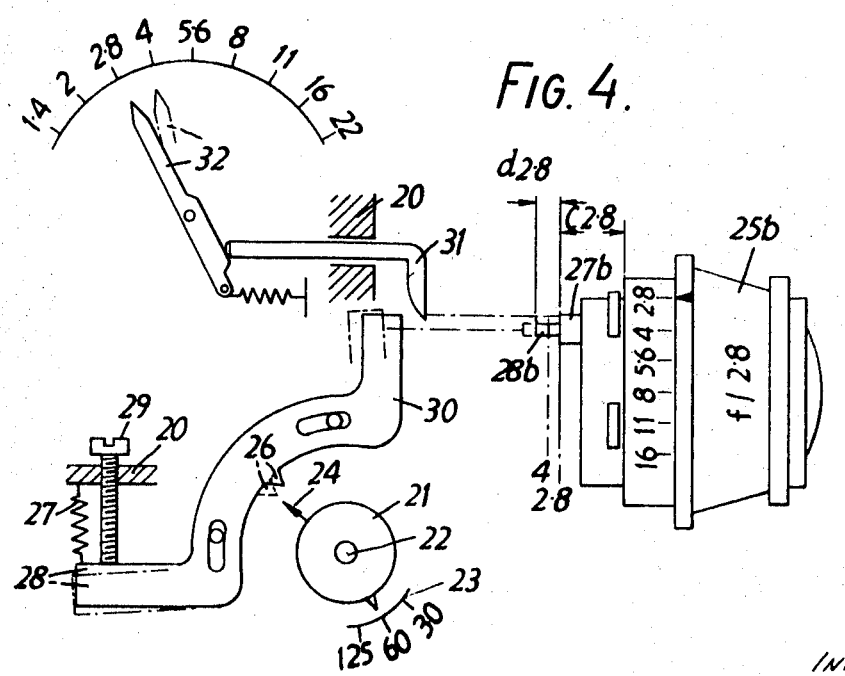

3,603,234

SINGLE-LENS REFLEX CAMERA WITH EXPOSURE METER

BACKGROUND TO INVENTION

The invention relates to a single-lens reflex camera with an exposure meter in which a photoelectric cell is influenced by light passing through an interchangeable lens, the setting means for the exposure meter being capable of being coupled, when a special lens is attached, both with a diaphragm setting device on the lens, for setting a preselected diaphragm aperture, and with a setting element of the lens for presetting its maximum aperture.

Known measuring devices of this kind, such as described in E. Ger. Pat. No. 43102 and Brit. Pat No. 1,099,172, perform a measuring function when the lens diaphragm is fully open. In order to accommodate lenses having different maximum apertures, each lens has to be provided with a device which presents the exposure meter according to the particular maximum apertures and in the case of preselector diaphragms, provides a control dependent on the preselector diaphragm setting. With these known devices only special lenses equipped with the device can be utilized. An object of the invention is to provide a camera which overcomes this disadvantage and permits a standard lens to be utilized with the camera.

SUMMARY OF THE INVENTION

According to the invention a photographic camera having a housing is provided with an exposure meter arranged on the housing and including a photoelectric device for illumination by light passing through a detachable objective lens mounted on the housing, which objective lens includes a diaphragm presetting control, first indicating means arranged on the housing and influenced with regard to position by the photoelectric device in accordance with prevailing light conditions, a second indicating means movable within the housing by a first setting element provided on the objective lens, the position of which setting element being adjustable by movement of the diaphragm presetting control of the lens and a second setting element provided on the lens operatively connectable with one of the indicating means selected from the group consisting of said first and second indicating means, the position of which second setting element being arranged according to the maximum aperture of the attached lens and being effective to preset the exposure meter according to the maximum aperture of the lens by moving said selected indicating means whereby, alignment of the first indicating means and the second indicating means by means of the diaphragm presetting control of the lens presets the aperture to a value required for accurate exposure and in the event of an objective lens having a diaphragm control without presetting control and without setting elements being attached, the first and second indicating means attains a predetermined relative position which is capable of alteration by adjustment of the lens diaphragm aperture until the first indicating means is aligned with the second indicating means thereby providing an indication that the aperture is set to a value required for accurate exposure.

Brief Description of Drawings

The invention is explained by reference to certain examples illustrated and described in the accompanying drawing in which:

FIGS. 1 and 2 show an exposure meter in conjunction with special lenses having a correction value lug separate from the diaphragm stop adjuster, and FIGS. 3 and 4 show an exposure meter in conjunction with special lenses having a correction value lug connected with the diaphragm stop adjuster.

SPECIFIC DESCRIPTION

In a partly illustrated camera housing 1 (cf. FIGS. 1 and 2) the galvanometer is mounted so that it can rotate about its shaft 3. The moving coil of the galvanometer 2 bears a first indicating means in the form of a needle 4 and is connected in a know manner to a photoelectric cell which is illuminated by rays passing through an interchangeable lens 5a, b etc. The galvanometer 2 is subjected to the action of an adjuster spring 6 which tends to rotate the galvanometer 3 in a clockwise direction as viewed in the drawings.

A galvanometer 2 is provided with a stop arm 7, the adjustable stop 8, being situated opposite the latter, and with a regulating arm 9 which can be acted on by second setting elements in the form of maximum aperture adjusting abutments, 10a, 10b...10 rigidly pull tab on the interchangeable lenses. The length of the abutments 10a, 10b...10n corresponds to the particular maximum aperture of the lens. From the scale 11, which serves solely for clarification, a reading can be taken of the diaphragm value of the maximum opening of the attached lens, which value had been provided by the abutments 10a, 10b....10n which set the position of regulating arm 9 of the exposure meter. The position of the stop 8 corresponds to the maximum opening of the fastest interchangeable lens, in the present example "1.4."

Opposite the needle 4 of the galvanometer 2 a second indicating means or a followup needle 12 is mounted adjustably and concentrically with the galvanometer 2. An adjusting spring 13 tends to rotate the followup needle 12 in a clockwise direction about its initial position as viewed in the drawing, thus causing the stop arm 14 to come to rest against the adjustable stop 15. The position of the stop 15 corresponds to the maximum opening of the fastest attachable lens, in the present case "1.4". A regulating arm 16 of the followup needle 12 is mounted opposite first setting elements in the form of diaphragm stop adjusters 17a, 17b...17n which are mounted in an axially movable manner on the interchangeable lenses 5a, 5b...5n. A diaphragm scale 18 can be adjusted to any desired value corresponding to the maximum value of an attached lens, by the diaphragm stop adjuster 17a, 17b...17n on the lens side, by rotating the diaphragm rings 18a, 18b...18n in relation to the diaphragm scales 19a, 19b...19n on the lens side.

When the lens 5a is attached (cf. FIG. 1) the axially movable diaphragm stop adjuster 17a and the rigid correction value lug 10a make contact with the regulating arm 16 of the followup needle 12 and the regulating arm 9 of the galvanometer 2 respectively. The followup needle 12 and the galvanometer 2 are thus rotated counterclockwise as viewed in the drawing from their initial positions defined by the stops 15 and 8. The galvanometer 2 is caused to assume an unalterable position, predetermined by the length B4 of the correction value lug 10a, while the followup needle 12 is adjustable in accordance with the length A4 of the diaphragm stop adjuster 17a. The abutments 10a, 10b....10n adjust the stop of the needle 4, in accordance with the maximum aperture of the particular lens 5a, 5b...5n selected, so that despite a difference in the maximum openings of the attachable lenses 5a, 5b...5n identical measuring results are obtained for a given amount of light. With the maximum openings selected for the lens diaphragm the formula $a_2$, $8-b_2$, $8=s_4-b_4$ const. applies where $a_{2.8}$, $b_{2.2}$, $a_4$ and $4-b_4$ are the lengths of the lugs 17a, 17b and 10a, 10b as shown in FIGS. 1 and 2. The correct diaphragm value for a given brightness is preselected when the followup needle has been moved so that it is situated opposite to the needle 4 of the galvanometer 2.

When a lens is attached that has no diaphragm stop adjuster 17a, 17b, 17n or abutment 10a, 10b, 10n capable of being coupled with the followup needle 12 on the camera side and with the galvanometer 2 on the camera housing then the followup needle 12 and the galvanometer 2, as a result of the adjusting springs 13 and 6, are moved into their initial positions defined by the stops 15 and 18. By partly closing the lens diaphragm the photoelectric cell can be dimmed to the extent required to ensure that the needle 4 will be opposite to the followup needle 12 resting against the stop 15. In the event of coincidence between the fixed followup needle 12 and the needle 4 of the galvanometer 2 the diaphragm aperture suitable for prevailing light conditions has been reached.

Another version is shown in FIGS. 3 and 4. In a partly illustrated camera housing 20 the galvanometer 21 is mounted so as to be rotatable about its shaft 22 and can be adjusted in accordance with a scale 23 with values for exposure times (or other exposure factors). The moving coil of the galvanometer 21 bears a needle 24 and is connected in a known manner to a photoelectric cell which is illuminated by rays passing through the camera lens 25a, 25b...25n.

Opposite the needle 24 of the galvanometer 21 scanning device in the form of a followup needle 26 is mounted adjustably and concentrically with the galvanometer 21. An adjusting spring 27 tends to cause a stop arm 28 to come to the rest against a adjustable stop 29, thus moving the followup needle 26 into its initial position. A regulating arm 30 of the followup needle 26 is mounted opposite a diaphragm stop adjuster 27a, 27b...27n mounted on the interchangeable lenses 25a, 25b...25n in such a way as to be axially movable, each of the diaphragm stop adjusters having a first setting element in the form of a maximum aperture adjusting abutment 28a, 28b...28, respectively, corresponding to the maximum opening of the lens. The length d of the correction value lugs 28a, 28b...28 are such that their end faces, interacting with the regulating arm 30 of the followup needle 26, are at the same distance from the bearing surface of the lens whenever the maximum opening of the lens diaphragms is set, i.e. the initial position of the followup needle 26, defined by the stop 29, corresponds to the position assumed by the followup needle 26, in the case of the preselected maximum opening of the lens diaphragm. A sensing element 31, provided on the camera housing engages with the diaphragm stop adjusters 27a, 27b...27n, and is coupled with a diaphragm indicator 32, which enables diaphragm values preselected on the lens to be additionally indicated.

When one the the lenses 25a, 25b...25n is attached the abutments 28a, 28b...28n connected with the diaphragm stop adjusters 27a, 27b...27n press against the regulating arm 30 of the followup needle 26. In the event of the preselected maximum opening the followup needle 26 remains in the initial position defined by the stop 29. By moving the diaphragm stop adjuster 27a, or 27b from the position corresponding to the maximum diaphragm aperture into one of the smaller diaphragm apertures the followup needle 26 is lifted off the stop 29, in opposition to the adjusting spring 27 and by means of the relevant abutments 28a or 28b. In this movement of the diaphragm stop adjusters 27a, 27b...27n the diaphragm remains fully open. The diaphragm aperture for the correct brightness has been preselected if the followup needle 26 is situated opposite to the needle 24 of the galvanometer 21.

When a lens is attached which has no diaphragm stop adjuster 27a, 27b...27n capable of being coupled with a followup needle 26 then the followup needle 26 remains in the initial position defined by the stop 29. By partly closing the lens diaphragm the photoelectric cell can be dimmed to the extent required to ensure that the needle 24 of the galvanometer 21 is situated opposite to the followup needle 26. In the event of coincidence between the fixed followup needle 26 and the needle 24 the diaphragm aperture suitable for prevailing light conditions has been set.

We Claim:

1. In a single lens reflex camera having a housing, the provision of an exposure meter arranged on the housing and including a photoelectric device for illumination by light passing through a detachable objective lens mounted on the housing, which objective lens includes a diaphragm presetting control, first indicating means arranged on the housing and influenced with regard to position by the photoelectric device in accordance with prevailing light conditions, a second indicating means movable within the housing by a first setting element provided on the objective lens, the position of which setting element being adjustable by movement of the diaphragm presetting control of the lens and a second setting element provided on the lens operatively connectable with one of the indicating means selected from the group consisting of said first and second indicating means, the position of which second setting element being arranged according to the maximum aperture of the attached lens and being effective to preset the exposure meter according to the maximum aperture of the lens by moving said selected indicating means whereby, alignment of the first indicating means and the second indicating means by means of the diaphragm presetting control of the lens presets the aperture to a value required for accurate exposure and in the event of an objective lens having a diaphragm control without presetting control and without setting elements being attached, the first and second indicating means attains a predetermined relative position which is capable of alteration by adjustment of the lens diaphragm aperture until the first indicating means is aligned with the second indicating means thereby providing an indication that the aperture is set to a value required for accurate exposure.

2. A camera according to claim 1, wherein the first indicating means comprises a pivotably mounted galvanometer pivotable to preset the galvanometer to compensate for different exposure factors.

3. A camera according to claim 1, wherein the first indicating means comprises a pivotably mounted galvanometer urged in one pivotal direction towards an adjustable stop by a second means and movable in the other pivotal direction against the action of the spring means by the second setting element of the objective lens.

4. A camera according to claim 3 wherein the housing is provided with an aperture scale and the body of the first indicating means is provided with a pointer which pointer is effective to indicate on the scale the maximum aperture of an attached objective lens provided with a second setting element.

5. A camera according to claim 1 wherein there is provided a scale on the housing and an arm mounted on the housing movable across the scale by means of the first setting the lug of the objective lens to indicate the factor to which the diaphragm presetting device has been set.